Sept. 1, 1931.   W. E. SLOAN   1,821,241
VALVE
Filed Nov. 20, 1925
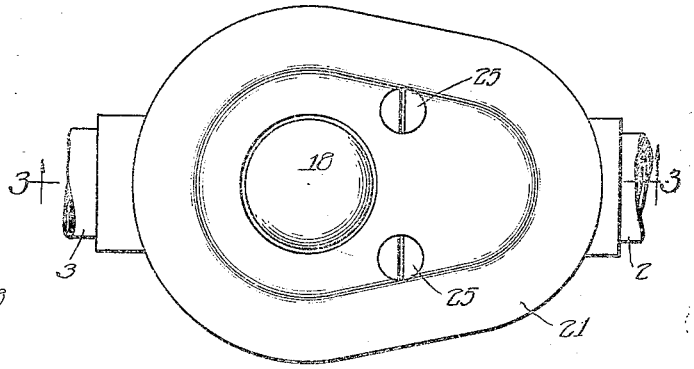
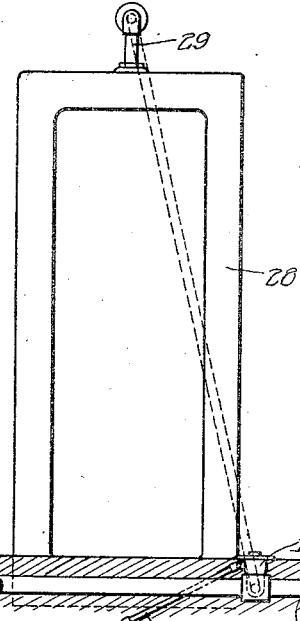
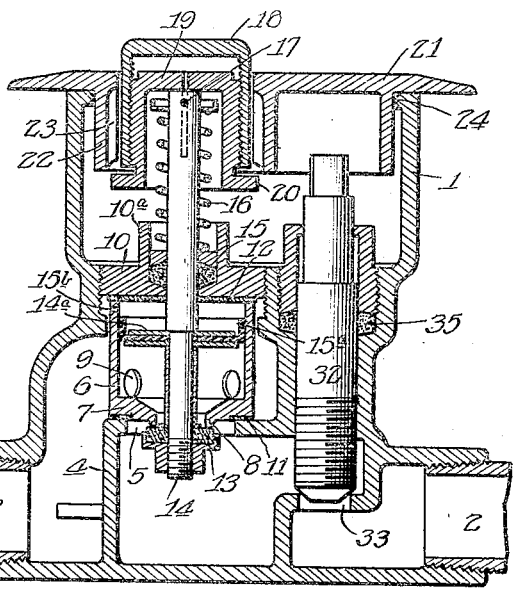
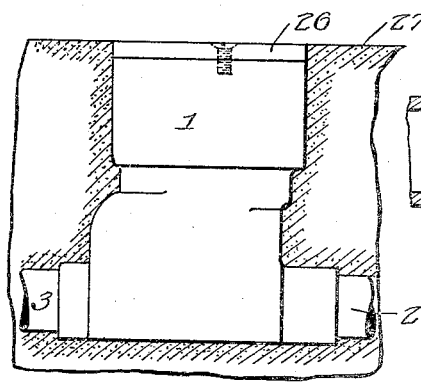
Inventor:
William E. Sloan.
By Parker & Barter Attys.

Patented Sept. 1, 1931

1,821,241

UNITED STATES PATENT OFFICE

WILLIAM E. SLOAN, OF CHICAGO, ILLINOIS

VALVE

Application filed November 20, 1925. Serial No. 70,324.

This invention relates to floor valves and has for its object to provide a new and improved valve of this description.

The invention has as a further object to provide a valve placed in the floor and adapted to be operated by the foot for discharging water into bowls that are desired to be flushed, such for example, as urinals.

The invention has as a further object to provide a valve of this description which is easily adjustable for different water pressures.

The invention has as a further object to provide a valve that can be easily installed while the building is under construction without injury thereto or such displacement thereof as would bring it into improper position with relation to the floor.

The invention has as a further object to provide a valve of this description wherein the valve is easily accessible and the working parts can be removed as a unit for inspection, alterations or repairs.

The invention has further objects which are more particularly pointed out in the accompanying description.

Referring now to the drawings:—

Fig. 1 is a view showing the valve in position.

Fig. 2 is a plan view of the valve.

Fig. 3 is a sectional view taken on line 3—3 of Fig. 2.

Fig. 4 is a view showing the valve as installed with a temporary cover while the building is being constructed.

Like numerals refer to like parts throughout the several figures.

As herein shown, the valve is provided with a casing 1 open at the top, the casing having an inlet 2 and an outlet 3. Across the casing extends a wall 4 containing an opening 5 which connects the inlet with the outlet. A removable member 6 is located above this wall 4 and is preferably hollow and cylindrical in form. The bottom 7 of this member is provided with an opening surrounded by the valve seat 8. The member 6 is provided with one or more openings 9 through which the water may pass when the opening through the bottom 7 is open.

The member 6 is provided with a top or cap 10 which has a threaded engagement with the casing 1 and which when in position forces the member 6 against the wall 4 so as to make a tight connection. A washer 11 is preferably used to insure this tight connection. There is also preferably a washer 12 between the member 6 and the cap 10. The cap 10 is provided with a part 10$^a$ which is non-circular so that a wrench may be inserted in the casing to engage the cap and remove it. Cooperating with the valve seat 8 so as to open or close the opening through the bottom 7 is a valve member 13 which has a stem 14 which passes up through said opening and through the member 6 and the cap 10 and extends to the top of the casing 1.

Within the member 6 and attached to the valve stem 14 is a piston 14$^a$ provided with a cup leather 15$^a$. This permits quick opening of the valve. There is also a small by-pass 15$^b$. The cup valve construction in connection with this small by-pass, opening or vent in the member 6 compels the valve to close slowly and without shock. A packing 15 is provided in the cap 10 to prevent leakage. Above this packing is a spring 16 surrounding the valve stem and held in a compressed condition by a holding device such as the pin 17. This spring engages the packing 15 and normally holds the valve member 13 against the valve seat 8 so as to close the passageway between the inlet 2 and the outlet 3. Mounted upon the valve stem 14 is a push button by means of which the valve stem is pushed to open the valve. This push button consists of an outer member 18 and an inner member 19, the two members being connected together by threads. The inner member 19 rests loosely on top of the valve stem and is provided with a lateral projection 20. The casing 1 is provided with a removable cover 21 which has an opening through which the push button projects, the member 18 extending above the cover as shown. Associated with this opening and extending along the push button is a wall 22, said wall preferably having inwardly projecting guide ribs 23. The projection 20 on the inner member of the push button engages these ribs or some part of the wall so as to prevent the push button from being pulled out when the cover is in position.

The casing preferably has at its upper edge a flange 24 which is engaged by the wall 22, the wall extending down below this flange. The wall does not form a tight fit with the flange and if the casing is inclined or twisted out of position during the construction of the building so that the valve stem is moved out of the vertical, the connection of the cover to the casing and of the push button to the valve stem still permits the cover to be parallel to the floor although not parallel to the top edge of the valve casing 1. The wall 22 also permits the proper positioning of the cover even though the top of the casing should be below the level of the floor as the cover can be moved away from the casing a predetermined distance and the wall still be within the casing.

The outer member 18 of the push button can be adjusted with relation to the inner member so as to project the proper amount from the cover. The inner member 19 is preferably split for a portion of its length so as to secure a tight fit between the two members and maintain the adjustment between the two members, and further, prevent the outer member being unscrewed from the inner member by anyone tampering with the valve. This construction also prevents the change of adjustment by unauthorized persons. The guide ribs 23 guide the push button in its movement and prevent binding thereof. They also prevent the push button from binding due to dirt or the like. In the construction shown the downward movement of the push button is limited by the members 20 striking the part 10ᵃ on the top 10. This insures the push button being pushed down the same amount each time, thus securing the same flow of water. The cover is held in position by the fastening devices 25. These fastening devices are of such length as to permit the proper adjustment of the cover with relation to the casing.

It will be noted that by this construction the push button is adjustably connected with the valve stem so that the top of the push button and the top of the cover 21 will be substantially parallel with the face of the floor even when the valve stem and the casing are inclined to the vertical a predetermined amount, this amount depending upon the size and arrangement of the parts.

A regulating and shut off valve 32 is provided which cooperates with the valve seat 33 so as to regulate the flow or shut off the water in the event it is desired to inspect the interior of the valve or remove or repair any of the parts. This shut off valve is located within the casing 1 and is provided with a suitable packing 35. The valve has a non-circular end by means of which it is controlled through the agency of a wrench by removing the cover 21. By means of this regulating valve the amount of water passing through the valve casing may be regulated by varying the size of the opening. In the event the pressure of the water system is high, for example, the amount of water passing through the valve can be properly regulated to secure the desired results. Since the water pressure varies through a very wide range, this regulating valve permits the proper regulation regardless of the pressure in the water system.

The device is ordinarily installed while the building is being constructed and before the floors are completed. Under these conditions the cover is liable to be injured and the valve body moved out of proper alignment. In order to prevent the cover and push button from being injured they are not placed in position until the floor is completed. When the valve is installed before the completion of the floor it is provided with a temporary cover 26 which is of cast iron and which has no projecting edge that can be bent or injured. This cover is shown in Fig. 4. In the construction of the building, when the valve is thus installed, the floor is built around the valve. This cover is then removed and the permanent cover 21 with the push button in place is installed, the projecting edges of this permanent cover engaging the floor 27 about the valve, and if the valve is out of alignment or the valve somewhat below the surface of the floor, this is taken care of by the cover and the push button as hereinbefore described.

In Fig. 1 I have shown a urinal 28 provided with a discharge pipe 29 which is connected with the water pipe 30 by means of a valve of the kind herein described. I prefer to provide the valve casing 1 with a drain 31 to carry off any water that may work in under the cover and around the push button.

I claim:—

1. A floor valve comprising a casing, an inlet and an outlet therefor, a valve member controlling the passage of the liquid through said casing, a stem connected with said valve member, a spring for normally holding the valve member closed, a cover for said casing having an opening therethrough, a push button in said opening, an adjustable connection between said push button and said valve stem for rocking the push botton with relation to the stem, which adjustment permits the top of the push button and the top of the cover to be substantially parallel with the surface of the floor when the valve stem is inclined to the vertical a predetermined amount.

2. A floor valve comprising a casing having an inlet and an outlet, a wall on the interior of said casing provided with an opening through which liquid passes from the inlet to the outlet, a valve member controlling said opening, a stem for said valve member, a removable hollow member through which said valve stem passes and which rests upon said wall, a piston in said hollow member and connected with said valve stem, a top for said hollow member separate therefrom and having a screw threaded engagement with the casing and adapted to engage said member and force it against said wall, said top intermediate the top and bottom of said casing, said stem passing through said top, a cover for said casing having an opening therein, a hollow push button in said opening projecting above the face of the casing, said stem being smaller in diameter than the hollow of said push botton and projecting therein, the inner surface of the upper end of said hollow push button resting loosely upon the top of said stem, and means for holding said push button against removal when the cover is in position.

3. A floor valve comprising a casing, a valve member therein, a stem connected with said valve member, a push button mounted on said stem, said push button comprising two hollow telescoping members having a threaded connection, said stem projecting into one of said hollow telescoping members, a spring which presses said stem toward the upper end of said push button and a cover for the casing through which the push button projects.

4. A floor valve comprising a casing, a valve member therein, a stem connected with said valve member, a push button mounted on said stem, said push button comprising two hollow telescoping members having a threaded connection, the inner member split for a portion of its length, and a cover for the casing through which the push button projects.

5. A floor valve comprising a casing, a valve member therein, a stem connected with said valve member, a push button mounted on said stem, said push button comprising two hollow telescoping members having a threaded connection said stem projecting into one of said hollow telescoping members, a spring which presses said stem toward the upper end of said push button, and a cover for the casing through which the push button projects, said cover being provided with a wall, the inner member of said push button having a projecting part which engages said wall.

6. A floor valve comprising a casing, a valve member therein for controlling the passage of liquid through said casing, a stem connected with said valve member, a cover for said casing having an opening therethrough, a wall connected with said cover in proximity to said opening and projecting into said casing, a hollow push button having an interior opening larger in cross section than said stem and into which the stem projects, the push button being loosely mounted on the top of said stem, whereby the top of the push button and of the cover may be arranged substantially parallel with the floor surface when the casing and the valve stem are inclined from the vertical a predetermined amount.

7. A valve comprising a casing, a regulating valve therein, a wall in said casing having an opening therein through which liquid passes when the regulating valve is open, a controlling device for said opening comprising a removable hollow member having a bottom with an opening therethrough and resting on said wall, a valve member controlling the opening in said bottom, a stem connected with said valve member and projecting through said opening and said hollow member, a top for said removable hollow member having a threaded connection with said casing and adapted to force it against said wall, said stem passing through said top, said top located near the middle of said casing and acting to shut off liquid from the upper part of the casing, a push button connected with said stem, and a removable cover for said casing through which the push button projects, said valve stem and associated parts being removable by removing the cover and unscrewing said top.

Signed at Chicago, county of Cook and State of Illinois, this 31st day of October, 1925.

WILLIAM E. SLOAN.